F. J. RANDALL.
GASKET FOR PIPE JOINTS.
APPLICATION FILED MAY 5, 1908.
949,658.
Patented Feb. 15, 1910.
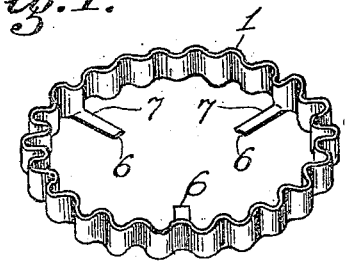
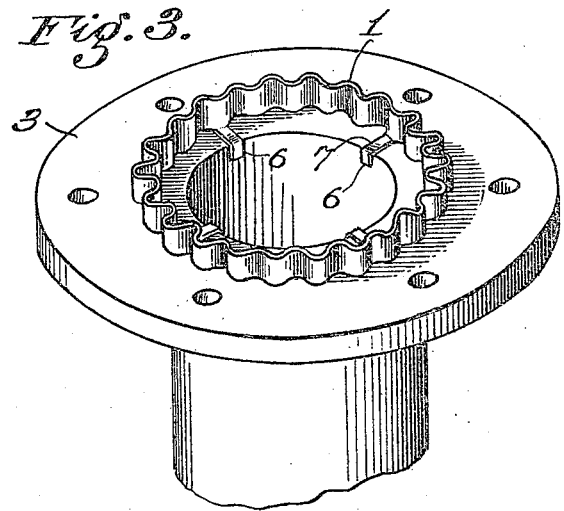
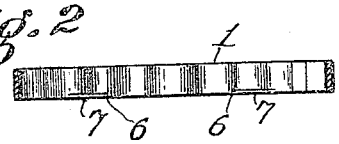
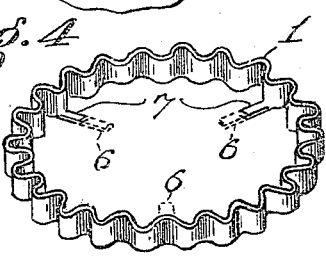
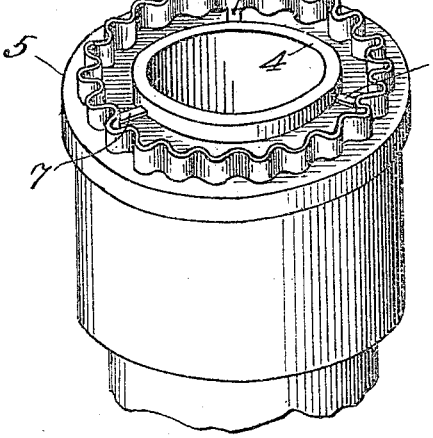
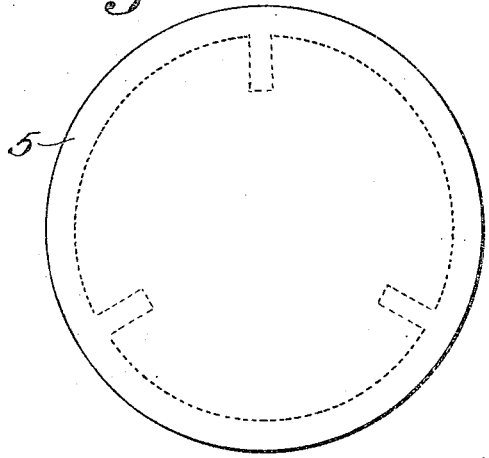
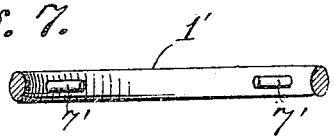
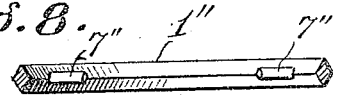
Witnesses
C. C. Holly
Julia Townsend
Inventor
Frank J. Randall
by James R. Townsend
his atty.

UNITED STATES PATENT OFFICE.

FRANK J. RANDALL, OF LOS ANGELES, CALIFORNIA.

GASKET FOR PIPE-JOINTS.

949,658.

Specification of Letters Patent.  Patented Feb. 15, 1910.

Application filed May 5, 1908. Serial No. 431,053.

*To all whom it may concern:*

Be it known that I, FRANK J. RANDALL, a citizen of the United States, residing at Los Angeles, in the county of Los Angeles and State of California, have invented a new and useful Improvement in Gaskets for Pipe-Joints, of which the following is a specification.

This invention relates to a gasket which is adapted for both flange and union joints for steam and other pipes.

The object of this invention is to provide a metallic gasket of maximum efficiency which can be appropriately applied to a pipe-joint with a maximum degree of convenience, and minimum attention skill and application of force and with minimum loss of time upon the part of the workman.

The invention is applicable with metallic gaskets of various forms among which may be mentioned plain and crimped sheet-metal gaskets, and plain and crimped gaskets of metallic wire of either circular or angular cross-section.

Usually, the gasket will preferably be made of copper, but I do not limit the invention to such material, as substitutes therefor may be employed where available and satisfactory.

The accompanying drawings illustrate the invention.

Figure 1 is a view of a gasket embodying this invention in one of its forms. Fig. 2 is a mid-section of the form shown in Fig. 1. Fig. 3 is a view of one member of a flanged pipe joint with the gasket shown in Fig. 1 in place ready to receive the other member of such joint. Fig. 4 is a view of a variation from the form of gasket shown in Fig. 1 constructed for application to a union joint. Dotted lines indicate extensions of the centering fingers which may have been removed from the form shown in Fig. 1 in order to produce the form shown in this view. Fig. 5 is a view of one member of a union joint to which the gasket shown in Fig. 4 has been applied. Fig. 6 is a view of a sheet-metal blank from which the form of gasket shown in Figs. 1 and 4 may be stamped. Dotted lines indicate the form of the portion of the blank to be used for forming said gasket. Fig. 7 is a view of a form of gasket made of round wire. Fig. 8 is a view of a form of gasket made of angular wire.

Like characters indicate corresponding elements in the several views, indices being added to such characters in some of the views to distinguish different forms of the same elements.

1 designates a crimped band provided with three or more inwardly-projecting fingers of less thickness than the depth of the band, and which are adapted in some instances to be bent away from the cross-sectional plane of the band to insert into the orifice of one member 3 of a flange joint, and in other instances are of such length and their ends are so spaced apart as to receive and engage the outside of the spigot 4 of a union joint 5, thereby to hold the body or band of the gasket properly positioned to close the joint when the other member of the joint, not shown, is fastened in place.

The fingers may be integral with or attached to the band. In the larger gaskets it may usually be found preferable to solder or braze the fingers to the band, while in smaller gaskets it may usually be found advisable to stamp the fingers of one piece with the band. The gasket may be stamped from a sheet of copper or other suitable material indicated at 5, and after being so stamped, or during the stamping process may be pressed into the band-like form shown in which the walls of the band extend parallel with the axis of the gasket and the fingers are at right angles thereto.

Preferably, the band is crimped, thus to counteract any tendency of the gasket to return to its flat form when the joint is tightened. In case the gasket is to be used on a flange joint the fingers will be bent to dispose their tips 6 at an angle to the main body 7 of the fingers so that said tips will fit within and against the walls of the orifice of the flange-joint. These same gaskets may be fitted for union joints by simply cutting off the bent tips of the fingers so that the fingers thus shortened will encircle and engage the outside of the spigot of the union.

In practical use it is only required of the workman that he apply the appropriate gasket to the appropriate member of the joint; and in the case of a flange joint, that he bring the fingers against the flange with their tips inserted in the orifice of the joint. Thereupon, the other member of the joint, not shown, will be brought into place and secured and tightened in the usual manner.

In case of a union joint, the workman will simply apply the gasket to the spigot member of the union, with the fingers encircling and engaging the outside of the spigot, and thereupon the other member of the union will be brought into place and screwed home, thus tightening the joint in the usual manner. The fingers in each kind of joint hold the gasket spaced apart from the orifice so that when the joint is tightened there is no communication between the orifice and the exterior of the joint. The number of fingers to be employed is not limited, providing that the gasket has at least a sufficient number of said fingers to prevent lateral displacement of the gasket. I deem it advisable in ordinary practice to employ a gasket having four inwardly-extending fingers, as the same serve to certainly and securely hold the gasket truly in place while the joint is being assembled and tightened.

The fingers are of less depth than the body of the gasket so that they offer no resistance to the approach of the members of the flange joint, and so that by a minimum pressure the gasket walls may be compressed sufficiently to close the joint while the fingers remain practically free in the space inside the gasket and are not in the way to prevent forming a tight joint.

By forming the gasket of sheet-metal crimped so that the crimps extend parallel with the axis of the gasket and bending fingers from the strip to extend inwardly to center the gasket, a gasket is provided that will yield sufficiently to the crushing pressure of the members of the joint when they are brought together to form the joint, and yet will not bent over so as to leave any opening for the escape of steam. The gasket in its preferred form is one solid piece of metal.

I claim:—

1. A metallic gasket consisting of a body provided with inwardly-extending centering fingers integral with and of less depth than the gasket-body and adapted to enter and engage the bore of the pipe.

2. A metallic gasket consisting of a body provided with inwardly-extending fingers that are integral with and are of less depth than the gasket-body, said fingers having tips bent at an angle to the body of the fingers to engage the bore of the pipe.

3. A gasket comprising a band formed of sheet metal, the walls of the band extending parallel with the axis thereof, and centering fingers integral with said walls and bent at right angles to and extending toward said axis to engage the bore of the pipe.

4. A gasket comprising a band formed of sheet metal, the walls of the band extending parallel with the axis thereof, and centering fingers integral with said walls and bent at right angles to and extending toward said axis, the tips of said fingers being bendable at right angles to the body of said fingers to engage the bore of the pipe.

5. A gasket comprising a band formed of sheet metal, the walls of the band extending parallel with the axis thereof, and centering fingers connected with said walls and bent at right angles to and extending toward said axis, the tips of said fingers being bendable at right angles to the body of said fingers to engage the bore of the pipe.

6. A gasket comprising a band formed of sheet metal, the walls of said band extending parallel with the axis of the band and one edge of said band being provided with extensions forming fingers, said fingers being inwardly bent to center the band to engage the bore of the pipe.

7. A metallic gasket consisting of a body provided with inwardly extending centering fingers integral with and of less depth than the gasket body.

In testimony whereof, I have hereunto set my hand at Los Angeles, California, this 28th day of April, 1908.

FRANK J. RANDALL.

In presence of—
JAMES R. TOWNSEND,
M. BEULAH TOWNSEND.